United States Patent
Kuo

(10) Patent No.: US 7,676,667 B2
(45) Date of Patent: Mar. 9, 2010

(54) BOOT CONTROL APPARATUS AND METHOD

(75) Inventor: Heng-Chen Kuo, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 537 days.

(21) Appl. No.: 11/565,637

(22) Filed: Dec. 1, 2006

(65) Prior Publication Data

US 2007/0260865 A1   Nov. 8, 2007

(30) Foreign Application Priority Data

Mar. 31, 2006   (CN)   ............ 2006 1 0060135

(51) Int. Cl.
    *G06F 1/00* (2006.01)
(52) U.S. Cl. ............................. 713/1; 713/2
(58) Field of Classification Search ........ 713/1, 713/2
    See application file for complete search history.

(56) References Cited

U.S. PATENT DOCUMENTS

| 4,367,422 | A | 1/1983 | Leslie | |
|---|---|---|---|---|
| 6,097,288 | A | 8/2000 | Koeppe, Jr. | |
| 6,510,064 | B1 | 1/2003 | Brown et al. | |
| 7,263,035 | B2 * | 8/2007 | Emery | 368/10 |
| 7,428,633 | B2 * | 9/2008 | Park et al. | 713/1 |
| 7,494,064 | B2 * | 2/2009 | Slutsky et al. | 235/472.01 |
| 2001/0047473 | A1 * | 11/2001 | Fallon | 713/2 |
| 2003/0121981 | A1 * | 7/2003 | Slutsky et al. | 235/462.45 |
| 2003/0149867 | A1 * | 8/2003 | Park et al. | 713/1 |
| 2006/0224875 | A1 * | 10/2006 | Choi et al. | 713/1 |
| 2007/0060119 | A1 * | 3/2007 | Emery | 455/423 |

FOREIGN PATENT DOCUMENTS

CN   1540503 A   10/2004

* cited by examiner

*Primary Examiner*—Abdelmoniem Elamin
(74) *Attorney, Agent, or Firm*—Wei Te Chung

(57) ABSTRACT

In one preferred embodiment, a boot control apparatus of an MCU includes a register, a reset signal generating circuit, and a controlling circuit. The register includes a first pin to receive a reset signal output from the reset signal generating circuit, and a second pin to receive a signal output from the controlling circuit. The controlling circuit includes a signal detecting circuit, and a delay circuit for delaying a signal output from the signal detecting circuit. The register is capable of sending a command to the MCU to allow the MCU to execute a warm boot if the first pin receives a reset signal and the second pin is at a low level, and sending another command to the MCU to allow the MCU to execute a cold boot if the first pin receives a reset signal and the second pin is at a high level.

12 Claims, 6 Drawing Sheets

BOOT CONTROL APPARATUS AND METHOD

BACKGROUND OF THE INVENTION

1. Field of the Invention

The present invention relates to boot control apparatus and method for a micro controller unit (MCU), especially to a boot control apparatus and method for efficiently booting the MCU.

2. Description of Related Art

When an MCU device is cold booted, initialization will be executed in the MCU. Generally, the initialization includes hardware verification, software resetting, and so on. E.g. I/O interfaces and memories self-checking. When the MCU device is warm booted, system parameters will be reset and software will be updated in the MCU. A cold boot takes more time than a warm boot. Generally, the MCU can correctly execute a warm boot or a cold boot depending on a corresponding button of the MCU device being activated. However, the MCU cannot differentiate between commands to execute a warm boot or to execute a cold boot when receiving reset signals from an internal source and so always executes a cold boot which wastes time.

What is desired, therefore, is boot control apparatus and method for efficiently booting an MCU.

SUMMARY OF THE INVENTION

In one preferred embodiment, a boot control apparatus of an MCU includes a register, a reset signal generating circuit, and a controlling circuit. The register includes a first pin to receive a reset signal output from the reset signal generating circuit, and a second pin to receive a signal output from the controlling circuit. The controlling circuit includes a signal detecting circuit, and a delay circuit for delaying a signal output from the signal detecting circuit. The register is capable of sending a command to the MCU to allow the MCU to execute a warm boot if the first pin receives a reset signal and the second pin is at a low level, and sending another command to the MCU to allow the MCU to execute a cold boot if the first pin receives a reset signal and the second pin is at a high level.

In one preferred embodiment, a boot control method of a boot control apparatus for booting an MCU is given. The boot control apparatus includes a register with a first pin and a second pin, a reset signal generating circuit connected to the first pin, and a controlling circuit connected to the second pin. The boot control method includes: the first pin of the register determining whether it receives a reset signal; doing nothing if the first pin does not receive any reset signal; the second pin of the register determining whether a voltage thereof is at a low level if the first pin receives a reset signal; the MCU executing a warm boot if the second pin is at a low level; the MCU executing a cold boot if the second pin is at a high level.

Other advantages and novel features will become more apparent from the following detailed description of preferred embodiments when taken in conjunction with the accompanying drawings, in which:

DETAILED DESCRIPTION OF THE INVENTION

Figure 1:
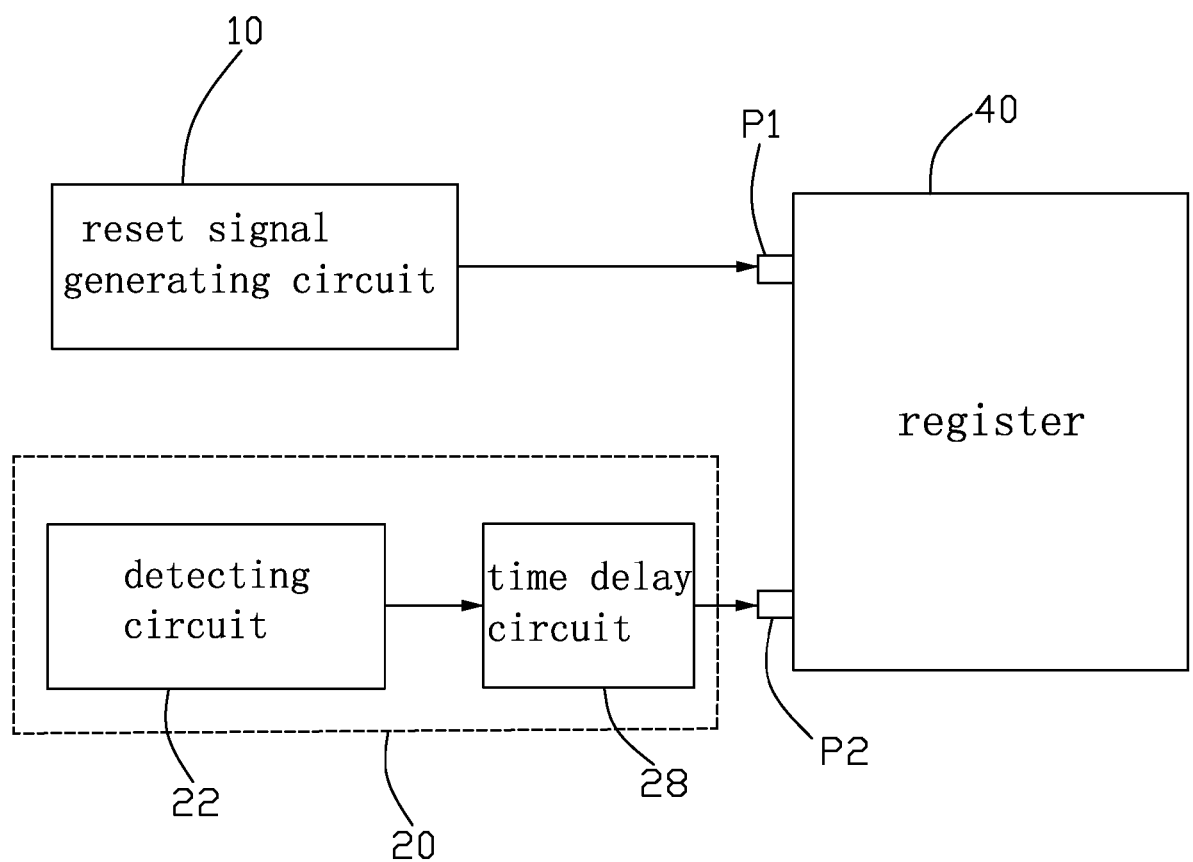
FIG. 1 is a block diagram of a boot control apparatus in accordance with a preferred embodiment of the present invention, the boot control apparatus including a reset signal generating circuit, and a controlling circuit.

Referring to FIG. 1, a boot control apparatus in accordance with a preferred embodiment of the present invention includes a register 40, a reset signal generating circuit 10, and a controlling circuit 20. The register 40 includes a first pin P1, and a second pin P2. The register 40 includes a determining circuit which can send MCU a command to execute a cold boot or a warm boot. The reset signal generating circuit 10 and the controlling circuit 20 receive power from a power supply source Vcc. The reset signal generating circuit 10 outputs a reset signal to the first pin P1 of the register 40. The controlling circuit 20 outputs a control signal to the second pin P2 of the register 40.

Figure 2:
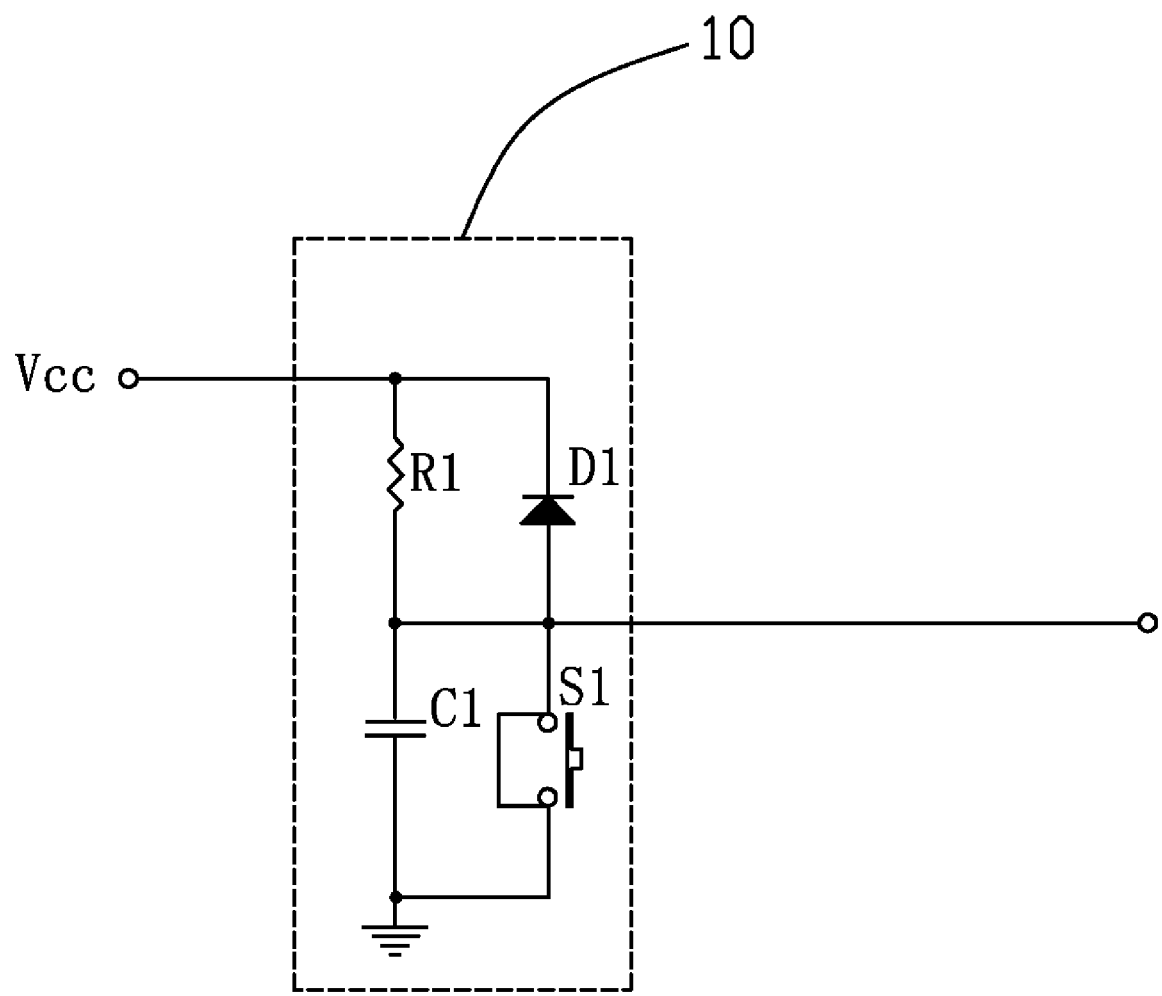
FIG. 2 is a circuit diagram of the reset signal generating circuit of FIG. 1.

Referring to FIG. 2, the reset signal generating circuit 10 includes a resistor R1, a diode D1, a capacitor C1, and a reset button S1. The resistor R1 and the capacitor C1 are connected between the power supply source Vcc and ground in series. The diode D1 and the button S1 are connected between the power supply source Vcc and ground in series. A cathode of the diode D1 is connected to the power supply source Vcc. An anode of the diode D1 is connected to the capacitor C1. A node between the diode D1 and the capacitor C1, and a node between the resistor R1 and the reset button S1 together are connected to the first pin P1 of the register 40. The reset button S1 is normally closed.

Figure 3:
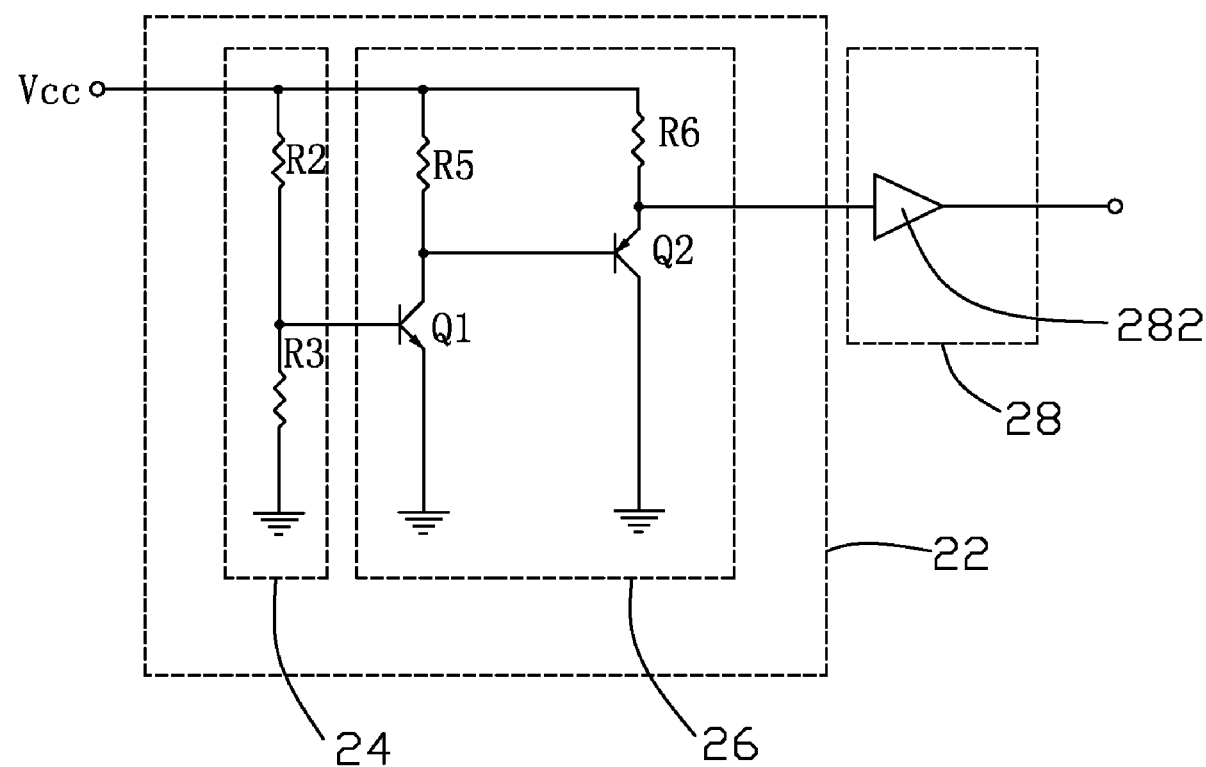
FIG. 3 is a circuit diagram of the controlling circuit of FIG. 1.

Referring to FIG. 3, the controlling circuit 20 includes a detecting circuit 22, and a time delay circuit 28 delaying a detecting signal output from the detecting circuit 22.

The detecting circuit 22 includes a voltage-division circuit 24, and a switch circuit 26. The voltage-division circuit 22 includes a resistor R2, and a resistor R3 connected between the power supply source Vcc and ground in series. The switch circuit 26 includes a resistor R5, and a transistor Q1, a resistor R6, and a transistor Q2. The transistor Q1 is an NPN transistor. A base of the transistor Q1 is connected to a node between the resistor R2 and the resistor R3. An emitter of the transistor Q1 is grounded. A collector of the transistor Q1 is connected to the power supply source Vcc via the resistor R5. The transistor Q2 is a PNP transistor. An emitter of the transistor Q2 is connected to the power supply source Vcc via the resistor R6. A base of the transistor Q2 is connected to the collector of the transistor Q1. A collector of the transistor Q2 is grounded. The emitter of the transistor Q2 outputs the detecting signal to the delay circuit 28.

The delay circuit 28 includes a time delay buffer 282. The detecting signal is delayed by the time delay buffer 282 for a predetermined time. Preferably, the predetermined time is in a range of hundreds of milliseconds. Then the time delay buffer 282 transfers the control signal to the second pin P2 of the register 40. The predetermined time is set to be greater than a time from power on to initialization. The predetermined time is not allowed to be too long to reduce a sensitivity of the MCU.

When the MCU device is powered, the power supply source Vcc provides power to the reset signal generating circuit 10 and the controlling circuit 20 at the same time.

Figure 4:
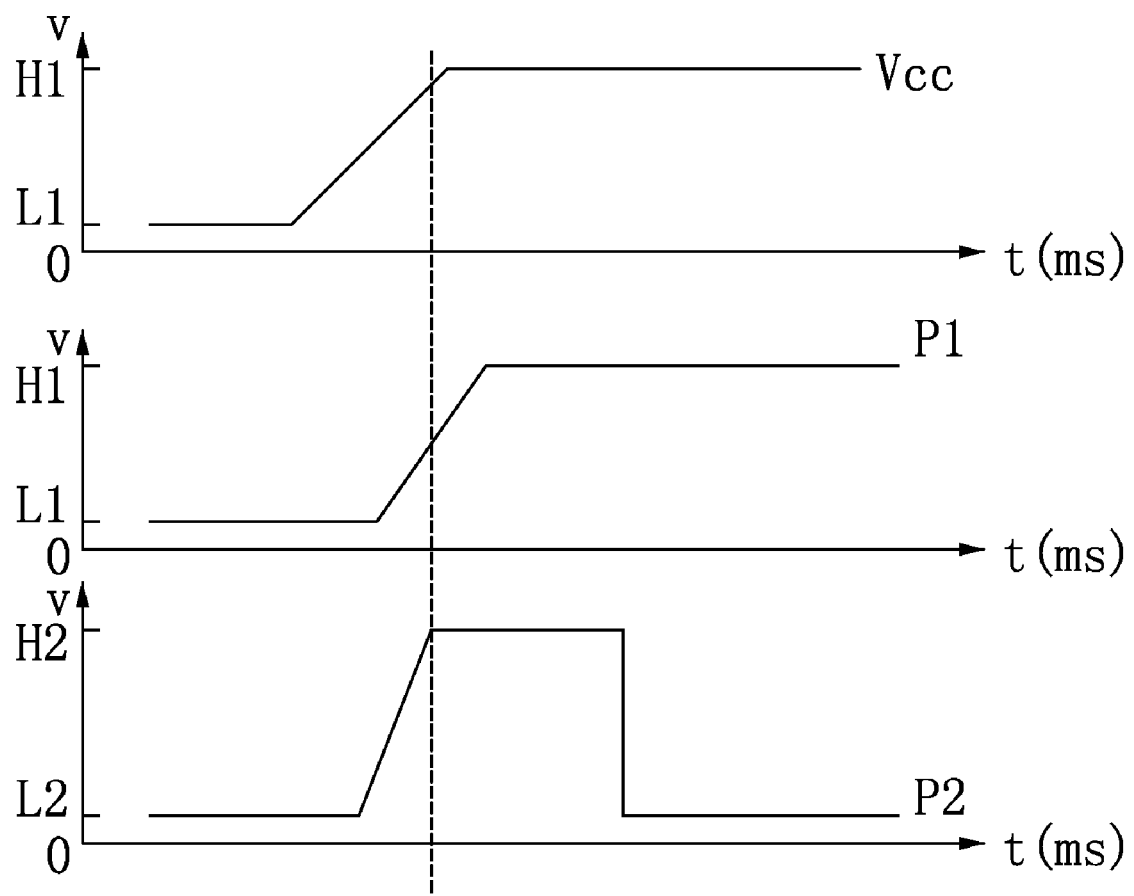
FIG. 4 is a graph of voltage variation of the boot control apparatus versus time when executing a warm boot.

Referring also to FIG. 4, the capacitor C1 is gradually charged, the first pin P1 of the register 40 receives the reset signal in its rising edge mode. When a voltage of the power supply source Vcc reaches 90% of the highest voltage (as shown by the broken lines in FIG. 4), a divided voltage from the voltage division circuit 24 makes the transistor Q1 turn on. Then the transistor Q2 turns on. The emitter of the transistor Q2 outputs the detecting signal at a low level to the time delay buffer 282 to be delayed for hundreds of milliseconds and then output to the second pin P2 of the register 40. The second pin P2 of the register 40 receives the control signal at a high level after expiration of the delay time. In this situation, the MCU executes a cold boot.

Figure 5:
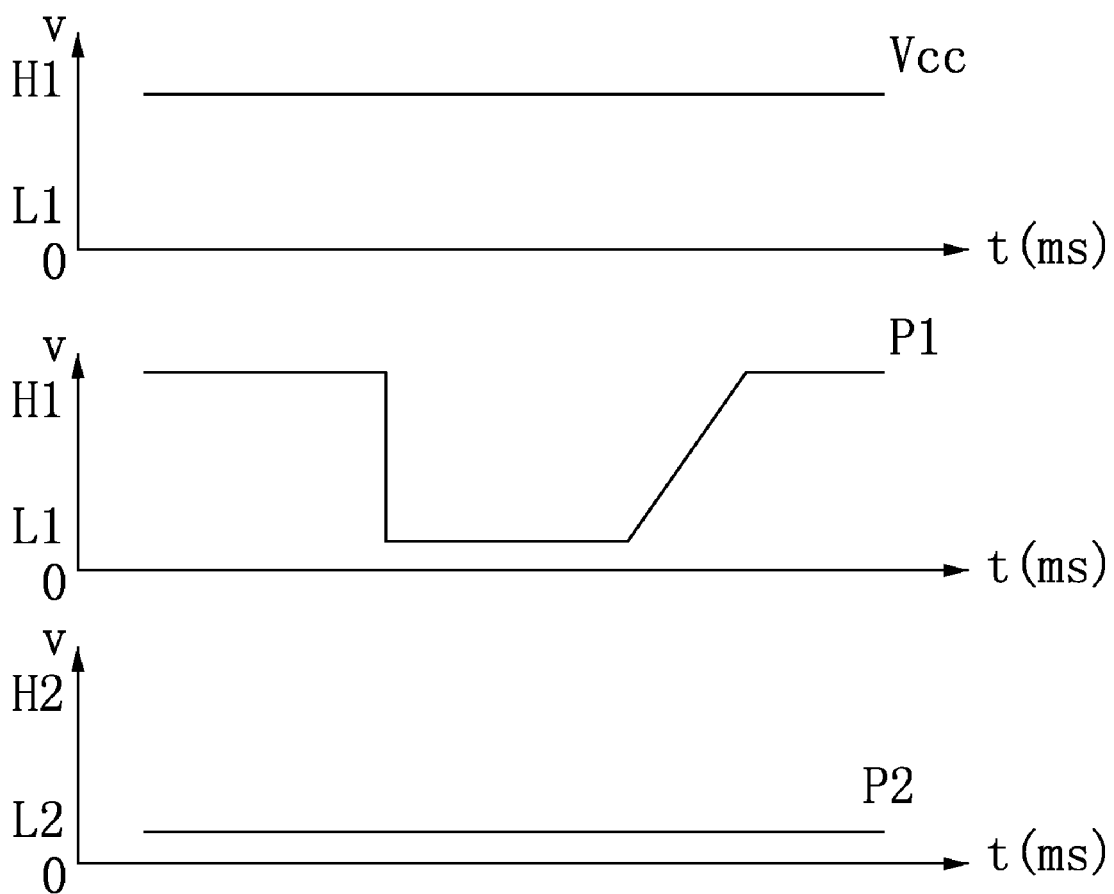
FIG. 5 is a graph of voltage variation of the boot control apparatus versus time when executing a cold boot.

Referring also to FIG. 5, the reset button S1 of the reset signal generating circuit 10 is pushed down and then released. Accordingly, the voltage on the first pin P1 of the register 40 is immediately decreased to zero and then the voltage on the first pin P1 of the register 40 gradually rises due to the capacitor C1 being charged after the reset button S1 is released. Thus, the first pin P1 of the register 40 receives a reset signal, again in its rising edge mode. While the second pin P2 is at a low level following expiration of the delay time. In this situation, the MCU executes a warm boot.

Figure 6:
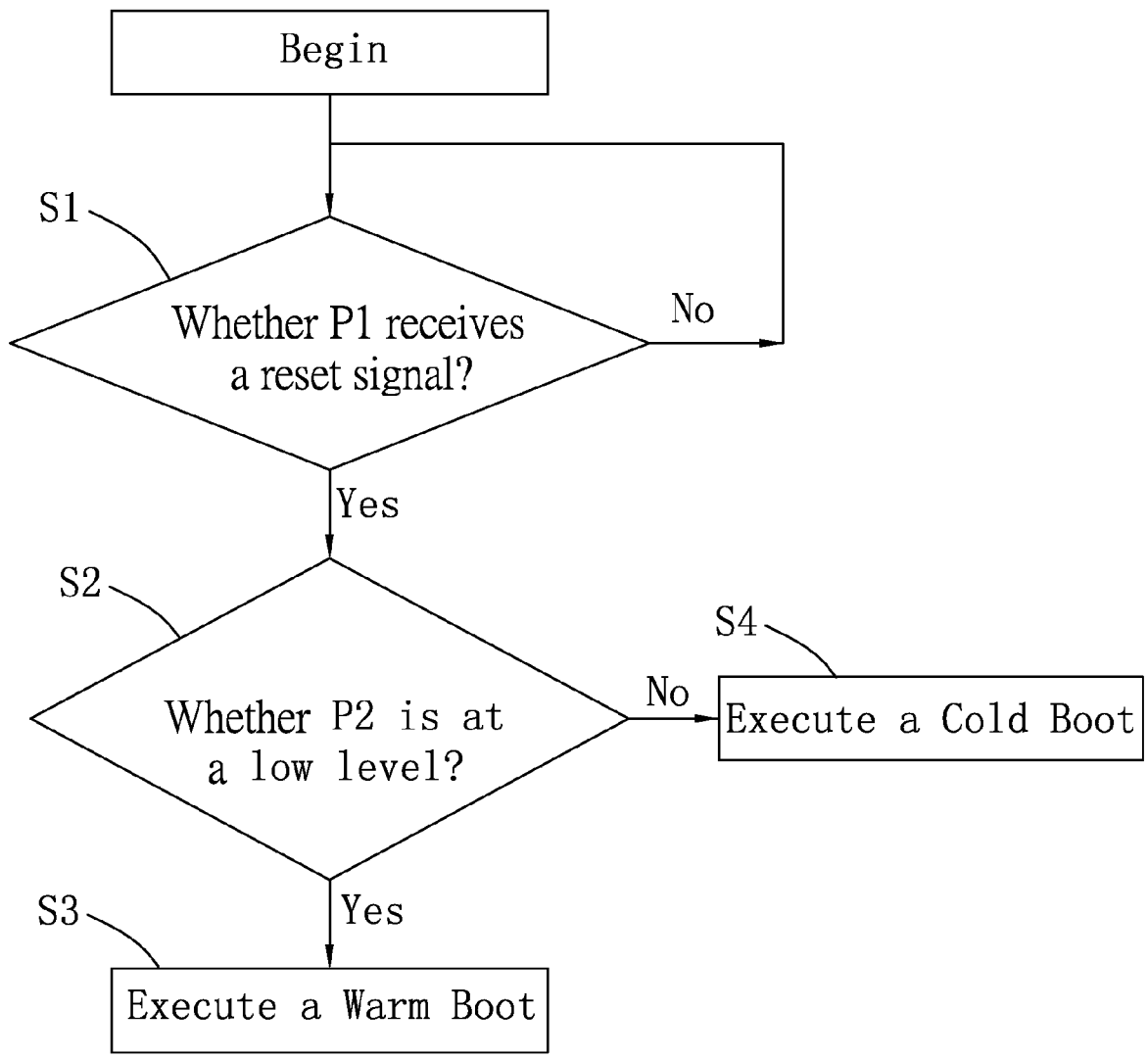
FIG. 6 is a flowchart of a determining process of a determining circuit of a register in accordance with a preferred embodiment of the present invention.

FIG. 6 is a flowchart of a determining process of a determining circuit of the register 40 in accordance with a preferred embodiment of the present invention to determine to execute a warm boot or a cold boot. In step s1, determining whether the first pin P1 of the register 40 receives a reset signal. If the first pin P1 does not receive any reset signals, no action is taken. If the first pin P1 receives a reset signal, in step s2, determining whether a voltage of the second pin P2 of the register 40 is at a low level. If the second pin P2 is at a low level, in step s3, the logic circuit sending the MCU a command to execute a warm boot. If the second pin P2 is at a high level, in step s4, the logic circuit sending the MCU another command to execute a cold boot.

It is believed that the present embodiments and their advantages will be understood from the foregoing description, and it will be apparent that various changes may be made thereto without departing from the spirit and scope of the invention or sacrificing all of its material advantages, the example hereinbefore described merely being a preferred or exemplary embodiment of the invention.

What is claimed is:

1. A boot control apparatus of a micro controller unit comprising:
   a register comprising a first pin and a second pin;
   a reset signal generating circuit coupled to the first pin for outputting a reset signal to the first pin, the reset signal generating circuit being powered by a power supply source; and
   a controlling circuit comprising a detecting circuit and a time delay circuit, wherein the detecting circuit comprises a voltage division circuit and a switch circuit connected in series, the voltage division circuit is for dividing the power supply source to obtain a first signal, the detecting circuit is for outputting a control signal to the second pin of the register according to the first signal;
   wherein the register is capable of sending a command to the micro controller unit to allow the micro controller unit to execute a warm boot if the first pin receives a reset signal and the second pin is at a low level, and sending another command to the micro controller unit to allow the micro controller to execute a cold boot if the first pin receives a reset signal and the second pin is at a high level.

2. The boot control apparatus as claimed in claim 1, wherein the reset signal generating circuit comprises a reset button, a resistor, and a capacitor, the resistor and the capacitor are connected between the power supply source and ground in series, one end of the button is connected to a node between the resistor and capacitor, another end of the button is grounded, the node is connected to the first pin of the register.

3. The boot control apparatus as claimed in claim 2, wherein the reset signal generating circuit further comprises a diode, an anode of the diode is connected to the power supply, a cathode of the diode is connected to the node.

4. The boot control apparatus as claimed in claim 3, wherein the reset button is normally closed.

5. The boot control apparatus as claimed in claim 1, wherein the voltage division circuit comprises a first resistor, and a second resistor connected between the power supply source and ground in series.

6. The boot control apparatus as claimed in claim 5, wherein the switch circuit comprises a first transistor, a third resistor, a second transistor, and a fourth resistor, a base of the first transistor is connected to a node between the first resistor and the second resistor, an emitter of the first transistor is grounded, a collector of the first transistor is connected to the power supply source via the third resistor, a base of the second transistor is connected to the collector of the first transistor, an emitter of the second transistor is connected to the power supply source via the fourth resistor, a collector of the second transistor is grounded, the emitter of the second transistor is connected to the second pin of the register.

7. A boot control apparatus of a micro controller unit comprising:
   a reset signal generating circuit comprising a reset button, wherein the reset signal generating circuit is coupled to a power supply source for generating a reset signal;
   a controlling circuit comprising a detecting circuit and a time delay circuit, wherein the detecting circuit comprises a voltage division circuit and a switch circuit connected in series, the voltage division circuit is for dividing the power supply source to output a first signal to the switch circuit, the switch circuit is for generating a detecting signal according to the first signal; and
   a register comprising a first pin coupled to the reset signal generating circuit for receiving the reset signal, a second pin coupled to the switch circuit for receiving the detecting signal, and a determining circuit configured for determining the state of the first pin and the second pin, wherein when the first pin and the second pin are at high level the determining circuit send a command to the micro controller unit to allow the micro controller to execute a warm boot, and when the first pin is in high level and the second pin is at low level the determining circuit send another command to the micro controller unit to allow the micro controller to execute a warm boot.

8. A boot control method for controlling a micro controller unit, the boot control method comprising:
   outputting a reset signal to a first pin of a register by a reset signal generating circuit;
   dividing a power supply source to obtain a first signal by a voltage division circuit;
   outputting a detect signal according to the first signal by a switch circuit;

delaying the detecting signal and outputting the detecting signal after delayed to a second pin of the register by a time delay circuit;

determining whether the detecting signal after having been delayed is at a high level or a low level by the register;

upon the condition that the detecting signal after having been delayed is at the high level, executing a cold boot by the micro controller unit; and upon the condition that the detecting signal after having been delayed is at the low level, executing a warm boot by the micro controller unit.

9. The boot control method as claimed in claim 8, wherein the reset signal generating circuit comprises a reset button, a resistor, and a capacitor, the resistor and the capacitor are connected between the power supply source and ground in series, one end of the button is connected to a node between the resistor and capacitor, another end of the button is grounded, the node is connected to the first pin of the register.

10. The boot control method as claimed in claim 9, wherein the reset signal is on a rising edge of the reset signal.

11. The boot control method as claimed in claim 8, wherein the voltage division circuit comprises a first resistor, and a second resistor connected between a power supply source and ground in series.

12. The boot control method as claimed in claim 11, wherein the switch circuit comprises a first transistor, a third resistor, a second transistor, and a fourth resistor, a base of the first transistor is connected to a node between the first resistor and the second resistor, an emitter of the first transistor is grounded, a collector of the first transistor is connected to the power supply source via the third resistor, a base of the second transistor is connected to the collector of the first transistor, an emitter of the second transistor is connected to the power supply source via the fourth resistor, a collector of the second transistor is grounded, the emitter of the second transistor is connected to the second pin of the register.

* * * * *